Sept. 28, 1954  H. V. ELLIOTT ET AL  2,690,483
DIRECTION SIGNAL SWITCH MECHANISM
Filed Aug. 5, 1952  4 Sheets-Sheet 1
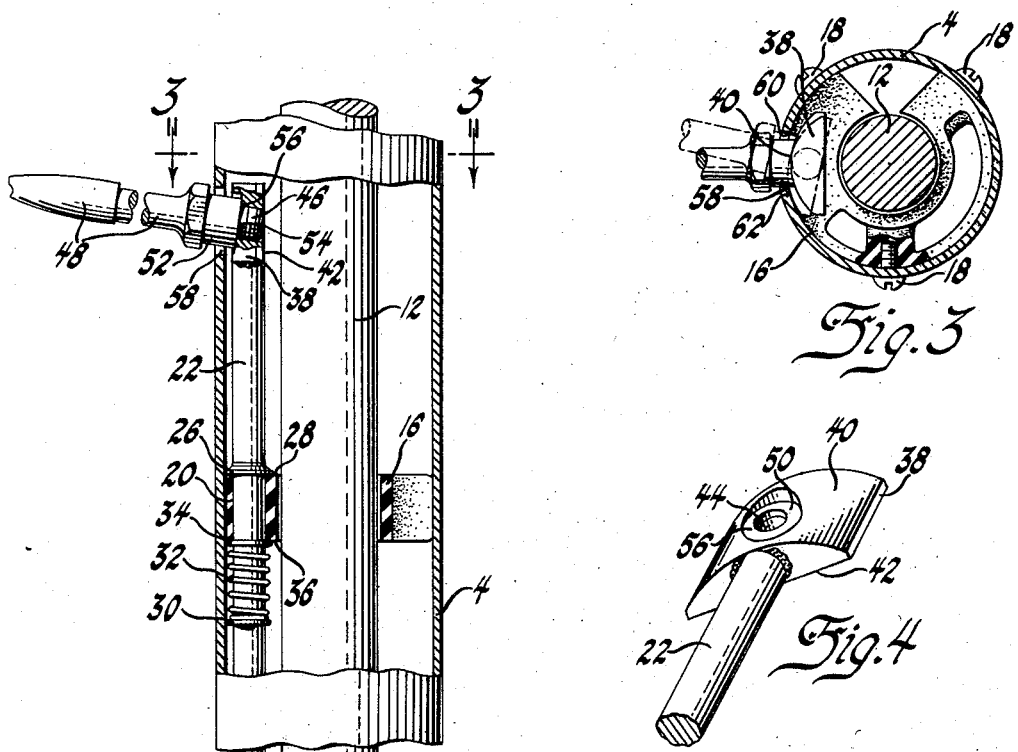
Inventors
Harold Vernon Elliott &
Argyle Glenn Lautzenhiser
By Willits, Helwig & Baillio
Attorneys

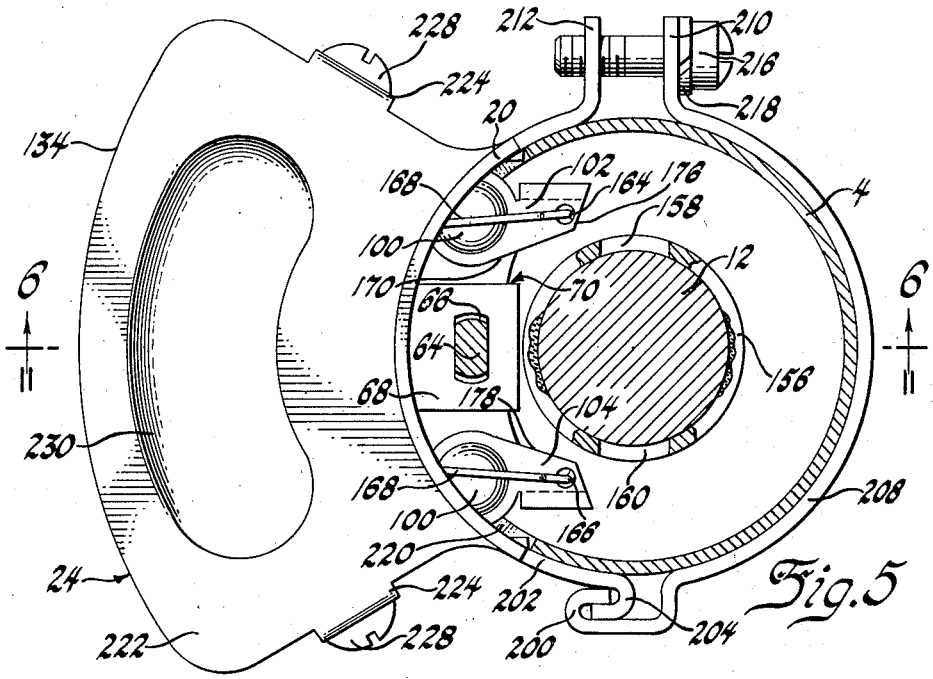
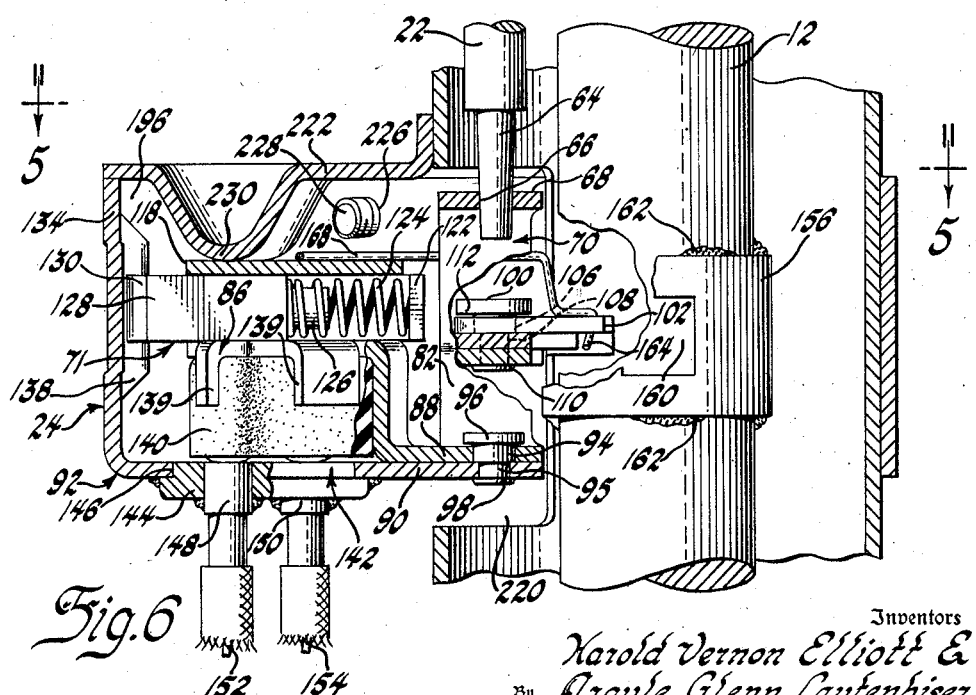

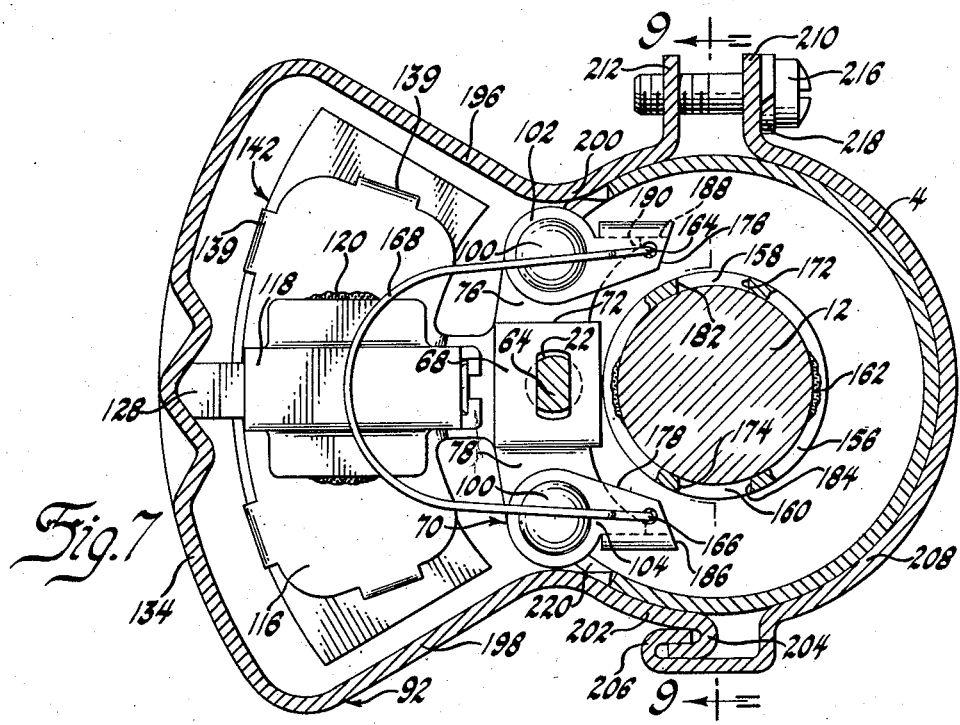
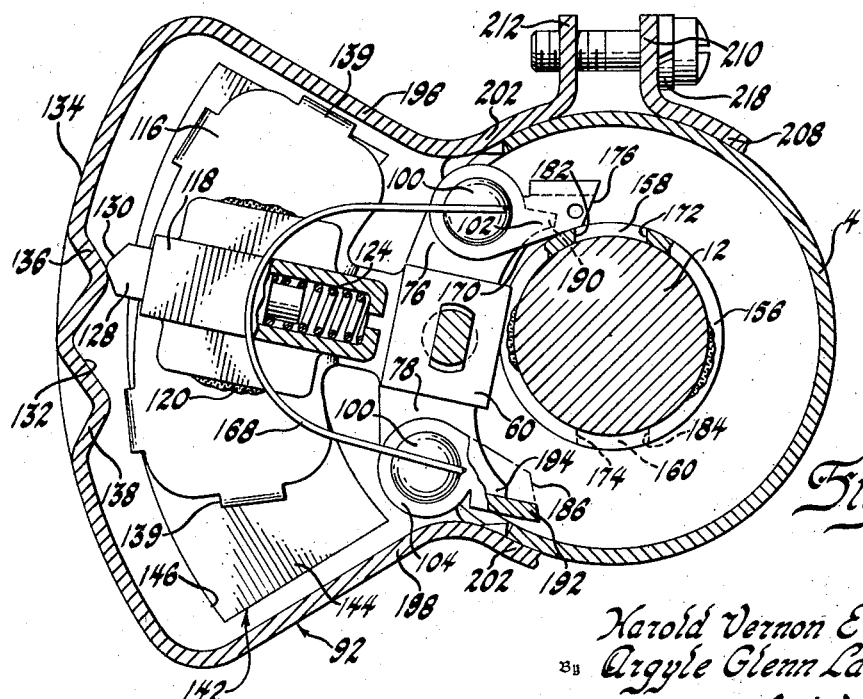

Sept. 28, 1954

H. V. ELLIOTT ET AL 2,690,483

DIRECTION SIGNAL SWITCH MECHANISM

Filed Aug. 5, 1952

Inventors
Harold Vernon Elliott &
By Argyle Glenn Lautzenhiser

Willits, Helwig & Baillio
Attorneys

Patented Sept. 28, 1954

2,690,483

UNITED STATES PATENT OFFICE 2,690,483

DIRECTION SIGNAL SWITCH MECHANISM

Harold Vernon Elliott and Argyle Glenn Lautzenhiser, Anderson, Ind., assignors to General Motors Corporation, Detroit, Mich., a corporation of Delaware Application August 5, 1952, Serial No. 302,800

18 Claims. (Cl. 200—61.35)

1

This invention relates to direction signal switches and more particularly to the operating mechanism for such switches.

Direction signal switch mechanism employed on motor vehicles are of varied types of constructions and are mounted at different locations with respect to the steering column. Many of the prior structures are of relatively complicated construction and therefore relatively expensive to manufacture. In other instances the signal switch mechanisms are so located with respect to the steering column that the parts thereof are inaccessible and require disassembly of a portion of the steering mechanism in order to gain access thereto.

One object of the present invention is to provide a simplified and generally improved direction switch operating mechanism which is readily accessible for adjustment and repair and yet the parts thereof are concealed from view.

Another object is to provide an actuating mechanism for direction signal switches having an operating handle which may be disposed at near or remote points from the switch actuating parts associated therewith.

A further object is to provide a switch actuating mechanism which for the most part may be constructed of sheet metal stampings thereby reducing the cost of manufacturing to a minimum.

A still further object is to provide a direction switch mechanism which is of simplified and rugged construction thereby insuring efficient service over long periods of time.

Other and further objects will become more apparent as the description of the invention progresses.

Of the drawings:

Fig. 1 is a side elevational view, partly in section, of a fragmentary portion of a motor vehicle showing the arrangement of the direction signal switch operating mechanism associated therewith.

Fig. 2 is a fragmentary view taken substantially along line 2—2 of Fig. 1, certain parts being shown in section and certain parts being broken away to more clearly show certain features of the switch actuating mechanism.

Fig. 3 is a sectional view taken substantially along line 3—3 of Fig. 2.

Fig. 4 is a perspective view of the upper portion of the operating shaft showing the means associated therewith to which the operating handle of the switch mechanism is attached.

Fig. 5 is a view, partly in section, of the switch operating mechanism taken substantially along line 5—5 of Fig. 1.

2

Fig. 6 is a sectional view taken substantially along line 6—6 of Fig. 5, certain parts being broken away to more clearly illustrate certain features of the operating mechanism.

Fig. 7 is a sectional view similar to Fig. 5 but with the cover of the casing removed to show the arrangement of the parts when the actuating handle is disposed in its mid or neutral position of adjustment.

Fig. 8 is a view similar to Fig. 7 but showing the arrangement of the switch operating parts when the switch has been actuated to a right-hand signal indicating position.

Figure 9:
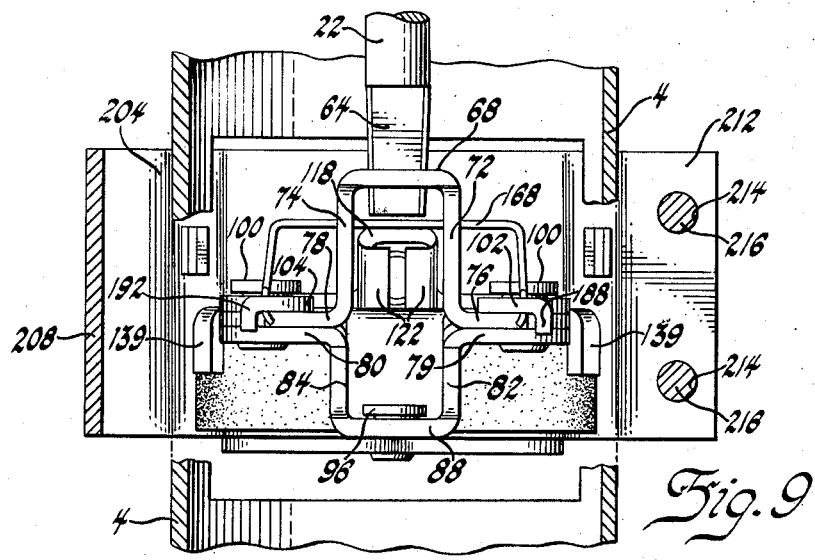
Figure 10:
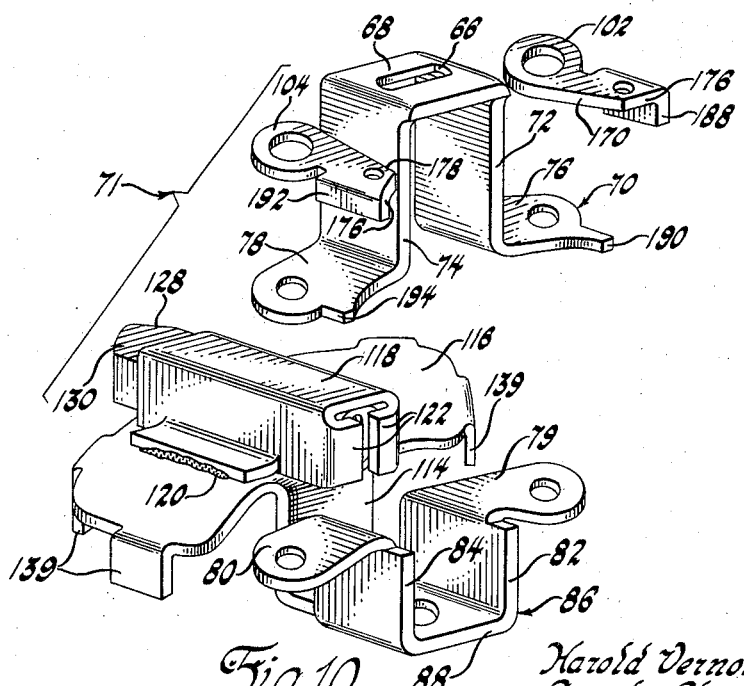

Fig. 9 is a sectional view of the switch operating mechanism taken substantially along line 9—9 of Fig. 7, and Fig. 10 is an extended perspective view of a number of the operating parts, comprising, the switch operating mechanism.

Referring to the drawings, the numeral 2 indicates generally a motor vehicle having supported in usual fashion interiorly thereof a steering column 4. Steering column 4 extends through and is supported as shown at 6 in the dash panel or fire wall 8 of the vehicle. A portion of the instrument panel 10 of the vehicle extends slightly above an intermediate portion of the steering column 4. Steering column 4 has supported interiorly thereof a steering shaft 12 having the usual steering wheel 14 secured to the upper end thereof. Shaft 12 is rotatably mounted in a resilient bearing 16 which is secured to the interior of the steering column 4 by machine screws 18 or by any other suitable means. Mounted for rotation in an opening 20 provided in intermediate bearing 16 is an operating shaft 22 for the switch operating mechanism indicated generally by the numeral 24. Shaft 22 has secured thereto in any suitable manner a collar 26 which bears against the upper surface 28 of bearing 16. A second collar 30 is secured to shaft 22 at a point some distance beneath bearing 16 and constitutes a seat for the lower end of a coil spring 32 surrounding shaft 22. A third collar 34 loosely mounted on shaft 22 forms an upper seat for spring 32 which urges said collar against the lower surface 36 of bearing 16. By mounting shaft 22 in a bearing constructed of rubber or other resilient material, noises caused by rattling of the parts is eliminated. Spring 32 also functions to maintain the shaft 22 in position and prevents rattle or other noises that might develop due to longitudinal vibration of shaft 22. The upper end of shaft 22 has welded or otherwise secured thereto a handle bracket 38 provided with an arcuate outer surface 40 and a substantially flat rectangular inner portion 42. Bracket 38 has provided centrally thereof an internally threaded opening 44 for receiving the externally threaded portion 46 of direction signal switch operating lever or handle 48. The bracket 38 is provided with a somewhat enlarged counterbore 50 which receives the enlarged inner end 52 of handle 48, the inner end 54 of portion 52 abutting the flat surface 56 of bracket 38 when handle 48 has been fully secured to bracket 38. The enlarged portion 52 of handle 48 extends through and operates in a transverse slot 58 provided in steering column 4.

The lower substantially rectangular portion 64 of shaft 22 seats in a correspondingly shaped opening 66 provided at the upper substantially flat portion 68 of the upper portion 70 of a switch operating member 71 and is resiliently held in said opening by spring 32. Portion 70 is of substantially inverted U-shaped construction and the side legs 72 and 74 thereof terminate at their lower ends in outwardly projecting flange portions 76 and 78. Flanges 76 and 78 are adapted to seat upon the outwardly extending flanges 79 and 80 provided at the upper ends of the legs 82 and 84, respectively, of the complementary portion 86 of member 71. The lower ends of legs 82 and 84 of lower portion 86 terminate in a flat web 88 which in assembly, as shown more particularly in Figs. 6 and 9, seats upon the flat bottom wall 90 of a casing 92. Web 88 and flat wall 90 are provided with aligned openings of different diameters for receiving respectively the correspondingly sized portions 94 and 95 of stud 96. The lower end of the reduced portion 95 of stud 96 is peened over, as shown at 98, to retain switch operating member 71 in position on wall 90. The head of stud 96 is spaced slightly from the upper surface of web 88 to permit member 71 to rotate about the enlarged portion 94 thereof as will appear more fully hereinafter. The flanges 76 and 78 of upper portion 70 of member 71 and the flanges 79 and 80 of the lower portion 86 thereof are provided respectively with aligned openings for receiving a pair of studs 100. A pair of pawls 102 and 104 are adapted to seat upon the upper surfaces of flanges 76 and 78, respectively, and also have provided therein enlarged openings which align with the openings provided in said flanges. Studs 100 are provided with enlarged portions 106 which operate as bearings for the pawls 102 and 104 and reduced portions 108 extending through the aligned openings in the flanges 76, 79 and 78, 80, and the lower ends thereof are peened as shown at 110 to hold the parts in position. The heads 112 of studs are spaced slightly from the upper surfaces of pawls 102 and 104 to provide sufficient clearance to permit the pawls to freely swing on the enlarged portions 106 of said studs. Web portion 88 terminates at the outer end in a vertical wall portion 114 which in turn terminates in a flat arcuate switch actuating portion 116 lying in a plane slightly above that of flanges 79 and 80. An elongated casing member 118 is secured to the upper surface of the arcuate portion 116 by welding as shown on 120, or by any other suitable means. The inner end of casing 118 is provided with a pair of inwardly extending flanges 122 which operate as a seat for the inner end of a coil compression spring 124. The other end of spring 124 surrounds the reduced cylindrical shank 126 of a reciprocable detent 128 and bears against the enlarged inner end of said detent. Detent 128 conforms to the inner cross sectional configuration of casing 118 and extends through an opening provided in the outer end of said casing. The outermost end 130 of detent 128 is substantially V-shaped in construction and is adapted to normally engage the correspondingly shaped depression 132 provided intermediate the ends of the substantially arcuate end wall 134 of casing 92. Wall 134 is also provided with downwardly and outwardly inclining portions 136 and 138 at the opposite sides of depression 132 for receiving the inclined sides of detent 128 when the latter has been moved to positions corresponding with right turn and left turn positions of the switch mechanism, respectively.

Disposed immediately beneath arcuate portion 116 of member 71 and held in position by a series of fingers 139 bent downwardly therefrom is the movable switch element 140 of a direction signal control switch indicated generally by the numeral 142. Switch 142 may be of any well-known construction, as for example, that shown and described in the co-pending application of Barcus S. N. 104,655, filed July 14, 1949 which became Patent 2,596,834 on May 13, 1952. Mounted on a switch plate 144 secured in a substantially arcuate opening 146 provided in the bottom wall 90 of casing 92 are a pair of switch terminals 148 and 150. Terminals 148 and 150 are connected, respectively, in an electric circuit including signal lamps mounted at the front and rear of the vehicle and also to tell-tale signal lamps which may be mounted on the instrument panel 10 by any suitable conductors indicated generally by the numerals 152 and 154. Switch 142 is of such construction that when the operating arm 48 is in its mid position and the associated parts assume the position shown in Fig. 7, in which position the circuit to all of the signal switches is interrupted. When the operating arm 48 is swung to the dotted-line position shown in Fig. 3, the parts assume the position shown in Fig. 8 and switch 142 is so actuated as to close the circuit to the right-hand signal lamps disposed at both the front and rear of the vehicle and also to the right-hand tell-tale lamps on the instrument panel. When the control lever is swung in the opposite direction the position of the parts will be reversed from that shown in Fig. 8, in which position the end 130 of detent 128 will engage the inner inclined surface 138 of end wall 134 thereby closing the circuit to the left-hand front and rear direction signal lamps of the vehicle and also to the left-hand tell-tale signal provided on the instrument panel 10.

Mounted on steering shaft 12 in substantial alignment with pawls 102 and 104 is collar 156. Collar 156 is provided with openings on recesses 158 and 160, at diametrically opposed points thereon, as shown more particularly in Figs. 5 to 8. Collar 156 may be secured to shaft 12 in any suitable manner, such as by welding, as shown at 162. Pawls 102 and 104 are provided with openings near the inner ends thereof for receiving the opposite ends 164 and 166 of U-shaped spring 168. Spring 168 resiliently urges pawls 102 and 104 toward each other and functions to return said pawl to normal position, as shown in Fig. 7, after being swung out of normal position during operation of the device. It is seen that when, for example, the parts assume the position shown in Fig. 8 to condition the apparatus for a right turn signal, pawl 102 will be swung from the position shown in Fig. 7 to the position shown in Fig. 8 when the lower surface 170 thereof will be brought into contact with the outer surface of collar 156. So long as the steering shaft 12 is rotated in a clockwise direction to effect a right turn operation of a car, the edges of recesses 158 and 160 will simply pass over the surface 170 thereof. However, upon rotation of shaft 12 in a counterclockwise direction to straighten the vehicle after making a right-hand turn, the shoulder 172 of recess 158 or the shoulder 174 of recess 160 will engage the end surface 176 of pawl 102 and thereby swing member 71 in a counterclockwise direction to return the parts to the neutral position shown in Fig. 7. It is also seen that as the outer end 130 of detent 128 passes the highest points adjacent recess or depression 132, spring 124 operating against the inclined face of detent 130 will assist in returning the parts to the position shown in Fig. 7. It is also seen that when the signal operating handle 48 is actuated in the reverse direction to condition the apparatus for a left-turn signal, the inner surface 178 of pawl 104 will be brought into engagement with collar 156. So long as the steering shaft 12 is rotated in a counterclockwise direction to effect a left-hand turning operation of the vehicle, the shoulder at the ends of slot 158 and 160 will ratchet over pawl 104 against the action of spring 168. However, upon movement of steering wheel 12 in a clockwise direction to straighten the vehicle after making the left-hand turn, either the shoulder 182 at the end of recess 158 or the shoulder 184 at the end of recess 160 will engage the end portion 186 of pawl 104 thereby causing the switch operating mechanism to be swung in a clockwise direction until the parts assume the position shown in Fig. 7. When the end 130 of detent 128 passes the high point of recess 132 the spring 124 will again assist in returning parts to the position shown in Fig. 7. Pawl 102 is provided with a downwardly extending flange 188 which when the parts are as shown in Fig. 7 lies against the stop 190 extending inwardly of flange 76. Pawl 104 is likewise provided with a downwardly extending flange 192 which when the parts assume the position shown in Fig. 7 abuts against the stop portion 194 extending inwardly from flange 78. The downwardly extending flanges 188 and 192 provided on pawls 102 and 104, respectively, thus prevent movement of the pawls inwardly beyond the position shown in Fig. 7.

The casing 92 is clamped to steering column 4 by mechanism shown more particularly in Figs. 1 and 5 to 8. The side walls 196 and 198 of casing 92 extend generally radially inwardly from the arcuate outer wall 134 thereof and are then bent outwardly as shown at 200 and 202, respectively, to conform with the curvature of steering column 4. The portion 202 is of arcuate construction and engages the outer surface of column 4 and terminates at its end in a hooked portion 204 which interlocks with a correspondingly hooked portion 206 provided at one end of a clamp member 208. The major portion of clamp 208 engages the steering column and conforms to the curvature thereof. The outer portion of the opposite end of clamp member 208 is bent outwardly as shown at 210. The arcuate portion 200 of wall 196 is also bent outwardly as shown at 212 and has provided therein a pair of spaced internally threaded openings 214 for receiving the threaded ends of a pair of machine screws 216. Machine screws 216 extend through aligned openings provided in the outwardly extending portion 210 and spring washers 218 are provided between the head portions of said machine screws and the outwardly extending portion. It therefore is seen that by tightening screws 216 the casing 92 may be effectively secured against the outer surface of steering column 4. As shown in Figs. 5 to 8 an enlarged opening 220 is provided in steering column 4 to accommodate the various operating parts just described. Casing 92 is closed at the upper end by means of a cover 222. Cover 222 corresponds in shape with casing 92 and has a pair of downwardly projecting apertured ears 224 which align with internally tapped openings 226 provided in the side walls 196 and 198, respectively, of casing 92. Cover 222 is held in position by means of a pair of machine screws 228. In order to insure proper contact between movable switch element 140 and the contacts provided in plate 144, cover 222 is provided with a depressed portion 230 which bears against the upper surface of casing 118. This holds the arcuate portion 116 against movement away from switch element 140. The cover 222 therefore in effect forms a resilient means for retaining the switch mechanism 142 in position.

From the foregoing description it is seen that a simplified and highly improved switch operating mechanism has been provided. The casing 92 and the elements mounted therein, it is clear, may be mounted at points either near the steering wheel or remote therefrom since the design is such that it may be readily mounted at any desired location along the steering column. It is also seen that the operating parts are effectively and resiliently held in position thereby preventing undue vibration of the parts and the elimination of undesirable noises as a result of such vibrations. It is also seen that the various parts are of simplified construction and therefore may be assembled with a minimum of time and effort. The various parts it is seen are also constructed in such a manner that long and efficient service is assured.

While but a single embodiment of the invention has been shown and described herein, it will be apparent to those skilled in the art that other and further embodiments may be made without departing from the spirit of the invention. It therefore is to be understood that it is not intended to limit the invention to the embodiment disclosed but only by the scope of the claims which follow.

What is claimed is:

1. In a device of the class described, the combination of a switch having fixed and movable contact elements, a pivotally mounted operating member for actuating said movable contact element to different positions of adjustment, a pair of pawls pivotally supported at spaced points on said operating member, stop means for limiting the movement of said pawls in one direction, a spring connected to said pawls for resiliently holding them in engagement with said stop means, rotary means disposed adjacent said pawls and adapted for rotation in either direction, shoulder means on said rotary means, direct acting remotely disposed actuating means for actuating said switch operating member to bring either of said pawls into a position closely adjacent to said rotary means, said pawls being so mounted on said switch operating member that when said rotary means is moved in one direction said shoulder means actuates the pawl so positioned about its pivot without moving said switch operating member, and when moved in the reverse direction said shoulder means engages said pawl to swing said pawl and switch operating member away from said rotary means until said shoulder means clears said pawl.

2. The structure claimed in claim 1, including means for holding said switch operating member in different positions of adjustment.

3. The structure claimed in claim 1 wherein said actuating means for said switch operating member comprises an elongated shaft, means for securing one end of said shaft to said switch operating member, a handle, and means for securing said handle to the other end of said shaft.

4. In a vehicle direction signal switch operating mechanism, the combination of a steering column, a steering shaft mounted within said column, a steering wheel connected to one end of said shaft, a direction signal switch unit mounted on said column, said switch unit comprising a casing mounted on said column, a switch mounted in said casing having fixed and movable contact elements, a switch operating member pivotally supported in said casing, a pair of pawls pivotally mounted on said switch operating member in spaced relation and lying adjacent said steering shaft, spring means for resiliently holding said pawls in position, a second shaft rotatably mounted in said steering column and extending lengthwise thereof, means operatively connecting one end of said second shaft to said switch operating member, a handle disposed adjacent said steering wheel connected to the other end of said second shaft for rocking the latter and said switch operating member, and means carried by said steering shaft adapted to engage said pawls to return said switch operating member to normal position after manual operation thereof to signal switch closing position.

5. In an automotive vehicle having a dash panel between the engine and passenger compartments thereof, a steering column extending through said dash panel and into said passenger compartment and having a steering shaft mounted therewithin and a steering wheel mounted at one end of said shaft, the combination of a casing mounted on said steering column, a direction signal switch mounted in said casing having fixed and movable contact elements, a switch operating member pivotally supported in said casing, a pair of pawls pivotally mounted on said member and disposed in spaced relation adjacent said steering shaft, spring means for resiliently holding said pawls in operative position, spaced shoulder means on said steering shaft, means for actuating said operating member from a central position to switch closing positions in either direction, said member when swung in one direction from said central position bringing one of said pawls into close proximity to said steering shaft and when swung in the opposite direction bringing the other of said pawls into close proximity to said shaft, said pawls being so disposed with respect to said shaft that upon rotation of said shaft in one direction said shoulder means is adapted to rotate the pawl so positioned about its pivot and when rotated in the reverse direction said shoulder means engages said pawl to swing said switch operating member to normal position, and means on said operating member yieldably engaging a wall of said casing for holding said switch operating member in different adjusted positions.

6. The structure set forth in claim 5 including stop means on said operating member for limiting the movement of each of said pawls in one direction, and spring means for resiliently holding said pawls in engagement with said stop means.

7. The structure set forth in claim 5 including a cover for said casing for resiliently urging the said movable contact element of said switch into engagement with said fixed contact element during operation of said switch operating member to its different positions of adjustment.

8. In an automotive vehicle having a dash panel between the engine and passenger compartments thereof, a steering column extending through said dash panel and into said passenger compartment and having a steering shaft mounted therewithin and a steering wheel mounted at one end of said shaft, the combination of a casing mounted on said steering column, a direction signal switch mounted in said casing having fixed and movable contact elements, a switch operating member pivotally supported in said casing, a pair of pawls pivotally mounted on said member and disposed in spaced relation adjacent said steering shaft, spring means for resiliently holding said pawls in operative position, spaced shoulder means on said steering shaft, means for actuating said operating member from a central position to switch closing positions in either direction, said member when swung in one direction from said central position bringing one of said pawls into close proximity to said steering shaft and when swung in the opposite direction bringing the other of said pawls into close proximity to said shaft, said pawls being so disposed with respect to said shaft that upon rotation of said shaft in one direction said shoulder means is adapted to rotate the pawl so positioned about its pivot and when rotated in the reverse direction said shoulder means engages said pawl to swing said switch operating member to normal position, a spring urged detent carried by said switch operating member for holding the latter in different adjusted positions, and index means formed in said casing for receiving said detent.

9. In a vehicle direction signal switch mechanism, the combination of a casing, a switch mounted in said casing having a fixed insulated contact element and a movable insulated bridging contact element slidable over said fixed contact element, an operating member for said movable contact element, said operating member being formed of sheet material and comprising a flat lower supporting portion pivotally mounted in said casing, a raised transversely extending portion disposed in offset relation with said supporting portion and overlying said movable contact element and engaging the upper surface of the latter, and spaced depending means formed around the perimeter of said transversely extending portion adapted to engage the sides of said movable contact element to cause the latter to move with said switch operating member.

10. In a vehicle direction signal switch mechanism, the combination of a casing having bottom and side walls and an outer end wall, a switch mounted on said bottom wall having an insulated fixed contact plate and a movable insulated bridging contact element adapted for sliding movement over said fixed contact plate, a switch operating member mounted in said casing comprising a flat lower supporting portion and a raised transversely extending portion disposed in offset relation with said supporting portion, pivot means for pivotally mounting said supporting portion for swinging movement on the bottom wall of said casing, said transversely extending portion overlying and engaging the upper surface of said movable contact element, means depending from the outer edge of said transversely extending portion adapted to engage the sides of said movable contact element to cause the latter to move with said operating member when the latter is swung on its pivot, and means for holding said operating member in different positions of adjustment.

11. In a vehicle direction signal switch mechanism, the combination of a casing having bottom and side walls and an outer end wall, a switch mounted on said bottom wall having an insulated fixed contact plate and a movable insulated bridging contact element adapted for sliding movement over said fixed contact plate, a switch operating member mounted in said casing comprising a flat lower supporting portion and a raised transversely extending portion disposed in offset relation with said supporting portion, pivot means for pivotally mounting said supporting portion for swinging movement on the bottom wall of said casing, said transversely extending portion overlying and engaging the upper surface of said movable contact element, means depending from the outer edge of said transversely extending portion adapted to engage the sides of said movable contact element to cause the latter to move with said operating member when the latter is swung on its pivot, detent means mounted on said transversely extending portion, and index means provided in said end wall cooperating with said detent means to hold said operating member in different adjusted positions.

12. In a vehicle direction signal switch mechanism, the combination of a casing having bottom and side walls and an outer end wall, a switch mounted on said bottom wall having an insulated fixed contact plate and a movable insulated bridging contact element adapted for sliding movement over said fixed contact plate, a switch operating member mounted in said casing comprising a flat lower supporting portion and a raised transversely extending portion disposed in offset relation with said supporting portion, pivot means for pivotally mounting said supporting portion for swinging movement on the bottom wall of said casing, said transversely extending portion overlying and engaging the upper surface of said movable contact element, means depending from the outer edge of said transversely extending portion adapted to engage the sides of said movable contact element to cause the latter to move with said operating member when the latter is swung on its pivot, a spring urged detent mounted on said transversely extending portion, a casing for said detent, index means provided in the said end wall of said casing cooperating with said detent to hold said operating member in different positions of adjustment, a cover for said casing, and means depending from said cover engaging said detent casing to retain said movable contact element in engagement with said fixed contact plate during movement of said operating member to its different positions of adjustment.

13. In a vehicle direction signal switch mechanism, the combination of a casing having bottom and side walls and an outer end wall, a switch mounted on said bottom wall having an insulated fixed contact plate and a movable insulated bridging contact element adapted for sliding movement over said fixed contact plate, a switch operating member mounted in said casing comprising a flat lower supporting portion and a raised transversely extending portion disposed in offset relation with said supporting portion, pivot means for pivotally mounting said supporting portion for swinging movement on the bottom wall of said casing, said transversely extending portion overlying and engaging the upper surface of said movable contact element, means depending from the outer edge of said transversely extending portion adapted to engage the sides of said movable contact element to cause the latter to move with said operating member when the latter is swung on its pivot, detent means mounted on said transversely extending portion, index means provided in said end wall cooperating with said detent means to hold said operating member in different adjusted positions, an extension secured to said operating member, an operating shaft secured to said extension, and means for rocking said shaft to swing said switch operating member to its different positions of adjustment.

14. In a vehicle direction signal switch mechanism, the combination of a casing having bottom and side walls and an outer end wall, a switch mounted on said bottom wall having an insulated fixed contact plate and a movable insulated bridging contact element adapted for sliding movement over said fixed contact plate, a switch operating member mounted in said casing comprising a flat lower supporting portion and a raised transversely extending portion disposed in offset relation with said supporting portion, pivot means for pivotally mounting said supporting portion for swinging movement on the bottom wall of said casing, said transversely extending portion overlying and engaging the upper surface of said movable contact element, means depending from the outer edge of said transversely extending portion adapted to engage the sides of said movable contact element to cause the latter to move with said operating member when the latter is swung on its pivot, detent means mounted on said transversely extending portion, index means provided in said end wall cooperating with said detent means to hold said operating member in different adjusted positions, a vertically disposed shaft secured to said operating member, a pair of spaced pawls pivotally mounted at either side of said extension, a steering shaft, spaced shoulder means mounted on said steering shaft, means connected to said extension for actuating said switch operating member to different adjusted positions, said member when actuated to one signaling position causing one of said pawls to move into the orbit of said shoulder means, and when actuated to another signaling position causing the other of said pawls to move into the orbit of said shoulder means, whereby said shoulder means is adapted to actuate the said pawl so positioned and switch operating member away from said steering shaft and toward a central position.

15. In a vehicle direction signal switch mechanism, the combination of a casing having bottom and side walls and an outer end wall, a switch mounted on said bottom wall having an insulated fixed contact plate and a movable insulated bridging contact element adapted for sliding movement on said fixed contact plate, a switch operating member mounted in said casing and movable from a central position to signal switch closing positions at either side of said central position, said switch operating member comprising, a lower, flat supporting portion mounted for pivotal movement on said bottom wall and a raised transversely extending portion disposed in offset relation with said supporting portion, interengaging means on said transversely extending portion and movable contact element for causing substantially simultaneous movement thereof, a steering shaft, a pair of spaced pawls pivotally mounted on said switch operating member and disposed adjacent said steering shaft, spaced shoulder means on said steering shaft, and rotatable shaft means parallel with said steering shaft for actuating said switch operating member to different positions of adjustment, said member when actuated to one signaling position causing one of said pawls to move into the orbit of said shoulder means and when moved in another signaling position causing the other of said pawls into the orbit of said shoulder means, whereby said shoulder means is adapted to engage the pawl so positioned to return said pawl and switch operating member to said central position.

16. In a vehicle direction signal switch mechanism, the combination of a casing having bottom and side walls and an outer end wall, a switch mounted on said bottom wall having an insulated fixed contact plate and a movable insulated bridging contact element adapted for sliding movement on said fixed contact plate, a switch operating member mounted in said casing and movable from a central position to signal switch closing positions at either side of said central position, said switch operating member comprising, a lower, flat supporting portion mounted for pivotal movement on said bottom wall and a raised transversely extending portion disposed in offset relation with said supporting portion, interengaging means on said transversely extending portion and movable contact element for causing substantially simultaneous movement thereof, a steering shaft, a pair of spaced pawls pivotally mounted on said switch operating member and disposed adjacent said steering shaft, spaced shoulder means on said steering shaft, means for actuating said switch operating member to different positions of adjustment, said member when actuated to one signaling position causing one of said pawls to move into the orbit of said shoulder means and when moved in another signaling position causing the other of said pawls into the orbit of said shoulder means, whereby said shoulder means is adapted to engage the pawl so positioned to return said pawl and switch operating member to said central position, and indexing means mounted on said switch operating member and casing end wall to hold said member and parts connected thereto in different positions of adjustment.

17. In a vehicle direction signal switch mechanism, the combination of a casing having bottom and side walls and an outer end wall, a switch mounted on said bottom wall having an insulated fixed contact plate and a movable insulated bridging contact element adapted for sliding movement on said fixed contact plate, a switch operating member mounted in said casing and movable from a central position to signal switch closing positions at either side of said central position, said switch operating member comprising, lower, flat supporting portion mounted for pivotal movement on said bottom wall and a raised transversely extending portion disposed in offset relation with said supporting portion, interengaging means on said transversely extending portion and movable contact element for causing substantially simultaneous movement thereof, a steering shaft, a pair of spaced pawls pivotally mounted on said switch operating member and disposed adjacent said steering shaft, spaced shoulder means on said steering shaft, means for actuating said switch operating member to different positions of adjustment, said member when actuated to one signaling position causing one of said pawls to move into the orbit of said shoulder means and when moved in another signaling position causing the other of said pawls into the orbit of said shoulder means, whereby said shoulder means is adapted to engage the pawl so positioned to return said pawl and switch operating member to said central position, an extended shaft operatively connected to said switch operating member and rotatable concentric therewith, and handle means mounted on said shaft and disposed at a substantial distance from said switch operating member for actuating the latter to different adjusted positions.

18. In a vehicle direction signal switch mechanism, the combination of a casing having bottom and side walls and an outer end wall, a switch mounted on said bottom wall having an insulated fixed contact plate and a movable insulated bridging contact element adapted for sliding movement on said fixed contact plate, a switch operating member mounted in said casing and movable from a central position to signal switch closing positions at either side of said central position, said switch operating member comprising, a lower, flat supporting portion mounted for pivotal movement on said bottom wall and a raised transversely extending portion disposed in offset relation with said supporting portion, interengaging means on said transversely extending portion and movable contact element for causing substantially simultaneous movement thereof, a steering shaft, a pair of spaced pawls pivotally mounted on said switch operating member and disposed adjacent said steering shaft, spaced shoulder means on said steering shaft, means for actuating said switch operating member to different positions of adjustment, said member when actuated to one signaling position causing one of said pawls to move into the orbit of said shoulder means and when moved in another signaling position causing the other of said pawls into the orbit of said shoulder means, whereby said shoulder means is adapted to engage the pawl so positioned to return said pawl and switch operating member to said central position, a cover for said casing, and means depending from said cover for holding said movable contact element in engagement with said fixed contact plate during movement of said switch operating member to its different positions of adjustment.

References Cited in the file of this patent

UNITED STATES PATENTS

| Number | Name | Date |
|---|---|---|
| 2,525,033 | Hollins | Oct. 10, 1950 |
| 2,542,242 | Fuller | Feb. 20, 1951 |
| 2,596,834 | Barcus | May 13, 1952 |